United States Patent
Griffith et al.

(10) Patent No.: US 8,694,821 B2
(45) Date of Patent: Apr. 8, 2014

(54) GENERATION OF STANDBY IMAGES OF APPLICATIONS

(75) Inventors: Douglas J. Griffith, Georgetown, TX (US); Angela A. Jaehde, Austin, TX (US); Manjunath B. Muttur, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/960,380

(22) Filed: Dec. 3, 2010

(65) Prior Publication Data

US 2012/0144232 A1    Jun. 7, 2012

(51) Int. Cl.
*G06F 11/00* (2006.01)

(52) U.S. Cl.
USPC ........................................................ 714/4.11

(58) Field of Classification Search
USPC ............. 714/4.11, 4.12, 4.21, 4.3, 6.12, 6.13, 714/6.23, 6.3, 6.32, 13–16, 41, 42
See application file for complete search history.

(56) References Cited

U.S. PATENT DOCUMENTS

| | | | |
|---|---|---|---|
| 5,737,514 A | 4/1998 | Stiffler | |
| 5,845,082 A | 12/1998 | Murakami | |
| 5,907,673 A | 5/1999 | Hirayama et al. | |
| 5,951,695 A | 9/1999 | Kolovson | |
| 5,958,070 A | 9/1999 | Stiffler | |
| 6,332,200 B1 | 12/2001 | Meth et al. | |
| 6,401,216 B1 | 6/2002 | Meth et al. | |
| 6,477,663 B1 | 11/2002 | Laranjeira et al. | |
| 6,574,752 B1 * | 6/2003 | Ahrens et al. | 714/43 |
| 6,678,704 B1 | 1/2004 | Bridge, Jr. et al. | |
| 6,691,245 B1 * | 2/2004 | DeKoning | 714/6.31 |
| 6,728,960 B1 * | 4/2004 | Loomans | 718/102 |
| 6,802,021 B1 | 10/2004 | Cheng et al. | |
| 7,069,401 B1 * | 6/2006 | Noonan et al. | 711/162 |
| 7,114,096 B2 | 9/2006 | Freimuth et al. | |

(Continued)

FOREIGN PATENT DOCUMENTS

JP    11039178    2/1999

OTHER PUBLICATIONS

HP Partitioning Continuum for HP-UX11i on HP 9000 and HP Integrity servers, 2004, Retrieved from Internet< URL: http://www.web.archive.org/web/20051227174158/http://h71028.www7.hp.com/ERC/downloads/5982-9141EN.pdf>, 33 pages.

(Continued)

*Primary Examiner* — Nadeem Iqbal
(74) *Attorney, Agent, or Firm* — Schmeiser, Olsen & Watts LLP; Mark C. Vallone

(57) ABSTRACT

Embodiments that generate checkpoint images of an application for use as warm standby are contemplated. The embodiments may monitor accesses of external references by threads. An external reference may comprise a connection or use of services of an entity that is external to the set of processes that constitute the application, to which a process of the application attempts to connect by means of a socket or inter-process communication (IPC). Various embodiments comprise two or more computing devices, such as two or more servers. One of the computing devices may generate a checkpoint image of an application at a suitable point in time during initialization, when the state of the application is not yet dependent on interactions with external references. The second computing device may preload checkpoint image for the application and activate the checkpoint images when needed, following the specific resource management rules of the distributed subsystem.

22 Claims, 5 Drawing Sheets

(56) References Cited

U.S. PATENT DOCUMENTS

| | | | |
|---|---|---|---|
| 7,127,561 | B2 | 10/2006 | Hill et al. |
| 7,185,226 | B2 | 2/2007 | Chen et al. |
| 7,236,987 | B1 | 6/2007 | Faulkner et al. |
| 7,363,474 | B2* | 4/2008 | Rodgers et al. ............ 712/227 |
| 7,529,816 | B2 | 5/2009 | Hayden et al. |
| 7,613,749 | B2 | 11/2009 | Flynn, Jr. et al. |
| 7,650,552 | B2* | 1/2010 | Pourbigharaz et al. ....... 714/733 |
| 7,669,081 | B2* | 2/2010 | Lett et al. .................... 714/20 |
| 8,141,053 | B2* | 3/2012 | Levine ........................ 717/127 |
| 2003/0043736 | A1 | 3/2003 | Gonda |
| 2003/0126186 | A1* | 7/2003 | Rodgers et al. ............ 709/107 |
| 2003/0126375 | A1* | 7/2003 | Hill et al. .................... 711/145 |
| 2006/0020854 | A1* | 1/2006 | Cardona et al. ............. 714/13 |
| 2007/0250750 | A1* | 10/2007 | Pourbigharaz et al. ....... 714/746 |
| 2008/0034190 | A1* | 2/2008 | Rodgers et al. ............ 712/224 |
| 2009/0178036 | A1* | 7/2009 | Levine ........................ 718/1 |
| 2009/0210751 | A1 | 8/2009 | Cabezas et al. |
| 2011/0208908 | A1* | 8/2011 | Chou et al. .................. 711/112 |
| 2012/0144233 | A1* | 6/2012 | Griffith et al. ................ 714/13 |

OTHER PUBLICATIONS

Patrizio et al., Get Connected, Architectures for High Availability and Disaster Tolerance with HP serviceguard, Retrieved from Internet< URL: http://www.hpcollateral.com/Files/EcoCollateral_20090616_2363_Gray-Patrizio_v5_handout1-15Jun. 9_syla.pdf> Jun. 17, 2009, 1 page.

Read et al., Using Solaris™Cluster and Sun™Cluster Geographic Edition with Virtualization Technologies, Part No. 820-4690-10, Revision 1.0, Apr. 29, 2008, Sun Microsystems, 46 pages.

Burns et al., Fastpath Optimizations for Cluster Recovery in Shared-Disk Systems, Supercomputing 2004, 0-7695-2153-3/04 (c)2004 IEEE, 9 pages.

Nagarajan et al., Proactive Fault Tolerance for HPC with Xen Virtualization, ICS'07, Jun. 18-20, 2007, copyright 2007 ACM978-1-59593-768-1/07/0006, pp. 23-32.

Wang et al., Hadoop High Availability through Metadata Replication, CloudDB'09, Nov. 2, 2009, Copyright 2009 ACM 978-1-60558-802-5/09/11, pp. 37-44.

VMware High Availability, Concepts, Implementation, and Best Practices, Retrieved from Internet< URL: http://www.vmware.com/files/pdf/VMwareHA_twp.pdf>, White Paper, 29 pages, 2007.

VMware High Availability, Easily deliver high Availability for all of your virtual machines, Retrieved from Internet< URL: http://www.vmare.com/files/pdf/ha_datasheetpdf>, 2 pages, 2009.

VMware Fault Tolerance Recommendations and Considerations on VMware vSphere 4, Retrieved from Internet:< URL: http://www.vmware.com/files/pdf fault_tolerance_recommendations_considerations_on_vmw_vsphere4.pdf>, 16 pages, 2009.

Protecting Mission-Critical Workloads with VMware Fault Tolerance, Retrieved from Internet:< URL: http://www.vmware.com/files/pdf/resources/ft_virtualization_wp.pdf>, 8 pages, Dec. 2008, IDC #215390, vol. 1.

Veritas™Cluster Server User's Guide, Solaris, 5.0, symantec, www.symantec.com, 1 page, 2006.

Zheng et al., Performance Evaluation of Automatic Checkpoint-based Fault Tolerance for AMPI and Charm++, pp. 90-99, 2004, IEEE International Conference on Cluster Computing, San Deigo, CA (Sep. 2001).

Office Action (Mail Date May 30, 2013) for U.S. Appl. No. 12/958,389, filed Dec. 1, 2010, First Named Inventor Douglas J. Griffith.

Response (Filed Aug. 29, 2013) for U.S. Appl. No. 12/958,389, filed Dec. 1, 2010, First Named Inventor Douglas J. Griffith.

Response (Filed Aug. 29, 2013) for U.S. Appl. No. 12/958,389, filed Dec. 1, 2010, First Named Inventor: Griffith et al.

Office Action (Mail Date May 30, 2013) for U.S. Appl. No. 12/958,389, filed Dec. 1, 2010, First Named Inventor: Griffith et al.

\* cited by examiner

GENERATION OF STANDBY IMAGES OF APPLICATIONS

BACKGROUND

The present disclosure relates generally to computing devices. More particularly, the present disclosure relates to generating warm standby images of applications via external references of application threads in multiple computing device environments, such as in server cluster environments.

Common types of computing devices are desktop computers and server systems, with server systems frequently configured in a network comprising numerous servers. Computer resources in the network may be configured in a redundant fashion for fault tolerance. One such technique involves a so-called "cluster" configuration wherein a given node of the network and its associated resources (e.g., its processor and disk drives) are essentially "mirrored" to ensure redundancy. A high availability (HA) cluster typically includes multiple servers that host one or more applications. In the event of a failure of a server, another server of the cluster will take over a hosted application by either resuming it from a point in runtime (checkpoint) or by restarting it. Furthermore, clusters for application management may perform load balancing. Such clusters may manage applications and keep a certain number of instances of an application active, or provide further servers for the cluster with the goal of satisfying performance criteria, such as data throughput or processor usage The operating environment of an application managed by a cluster is commonly referred to as "resource group". A resource group may consist of applications, hardware devices, and operating system configuration settings that are used by the application during runtime. The configuration settings may include, for example, network addresses, file systems, and disks, which are managed as a unit by the cluster services. These resources are said to be in a "group" because it may be necessary that the resources move together in a coordinated manner to the same backup system. In other words, the resources in a resource group may need to stay together or be collected on the same computer at all times. Typically, a user or system administrator defines the contents of a resource group.

In clusters that manage applications, such as for high availability or load balancing, a warm standby state for an application means that the application has been started and initialized to some degree such that the application may start performing work after minimal delay. In the current state of the art, standby states of applications are not commonly employed in clusters because, for such state, application designers generally have to make provisions during application design.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Some embodiments comprise a method for generating a checkpoint image for warm standby. The method comprises a computing device executing a plurality of threads of an application during initialization of the application. The application comprises a set of processes. The computing device blocks execution of the plurality of threads. The computing device blocks the execution of at least one thread in response to detecting a reference that is external to the set of processes. The reference comprises the at least one thread attempting to communicate via a socket or an inter-process communication. In response to blocking execution of the plurality of threads, the computing device generates the checkpoint image to enable execution of the application via a second computing device.

Further embodiments comprise apparatuses having a processor, an application module, a thread controller module, and a checkpoint module. The application module executes, via the processor, a plurality of threads of an application and generates state of a set of processes for the application. The state comprises data generated during initialization of the application. The thread controller module determines points of execution for each thread of the plurality of threads at which to halt execution. The thread controller module blocks execution of one or more threads at points in response to the one or more threads attempting to access references that are external to the set of processes. An external reference comprises an attempt of communication via a socket or an inter-process communication. The checkpoint module creates a checkpoint image of the state in response to the thread controller module halting execution of the plurality of threads. The checkpoint module creates the checkpoint image to enable another apparatus to execute the application via the checkpoint image.

Further embodiments comprise a computer system for generating a checkpoint image for warm standby. The computer has one or more processors, one or more computer-readable memories, and one or more computer-readable, tangible storage devices. The embodiments have program instructions, stored on at least one of the one or more storage devices for execution by at least one of the one or more processors via at least one of the one or more memories, to execute a plurality of threads of an application for initialization of the application. The application comprises a set of processes.

The embodiments also have program instructions, stored on at least one of the one or more storage devices for execution by at least one of the one or more processors via at least one of the one or more memories, to monitor execution of the plurality of threads and block execution of a thread of the plurality of threads in response to detecting a call to one of a socket and an inter-process communication. Further, the embodiments have program instructions, stored on at least one of the one or more storage devices for execution by at least one of the one or more processors via at least one of the one or more memories, to enable creation of the checkpoint image of the set of processes in response to the blocking execution of the plurality of threads. Even further, the embodiments have program instructions, stored on at least one of the one or more storage devices for execution by at least one of the one or more processors via at least one of the one or more memories, to transfer the checkpoint image to a second computer system to enable the second computer system to start execution of the application via the checkpoint image.

Further embodiments comprise a computer program product for generating, via a first computing device, a checkpoint image for warm standby. The computer program product has one or more computer-readable, tangible storage devices. The computer program product has program instructions, stored on at least one of the one or more storage devices, to execute a plurality of threads of an application during initialization of the application, wherein execution of the application comprises generating state data of a set of processes. The computer program product has program instructions, stored on at least one of the one or more storage devices, to block execution of the plurality of threads. Blocking execution of at least one thread of the plurality comprises blocking execution in response to detecting a call to a reference that is external to the set of processes. References that are external to the set comprise attempts of communication via a socket or an inter-process communication.

The computer program product has program instructions, stored on at least one of the one or more storage devices, to generate the checkpoint image of the set to enable execution of the application via a second computing device. The program instructions to generate the checkpoint image generate the checkpoint image subsequent to the all threads of the plurality being halted.

BRIEF DESCRIPTION OF THE SEVERAL VIEWS OF THE DRAWINGS

Aspects of the various embodiments will become apparent upon reading the following detailed description and upon reference to the accompanying drawings in which like references may indicate similar elements.

DETAILED DESCRIPTION

Figure 1:
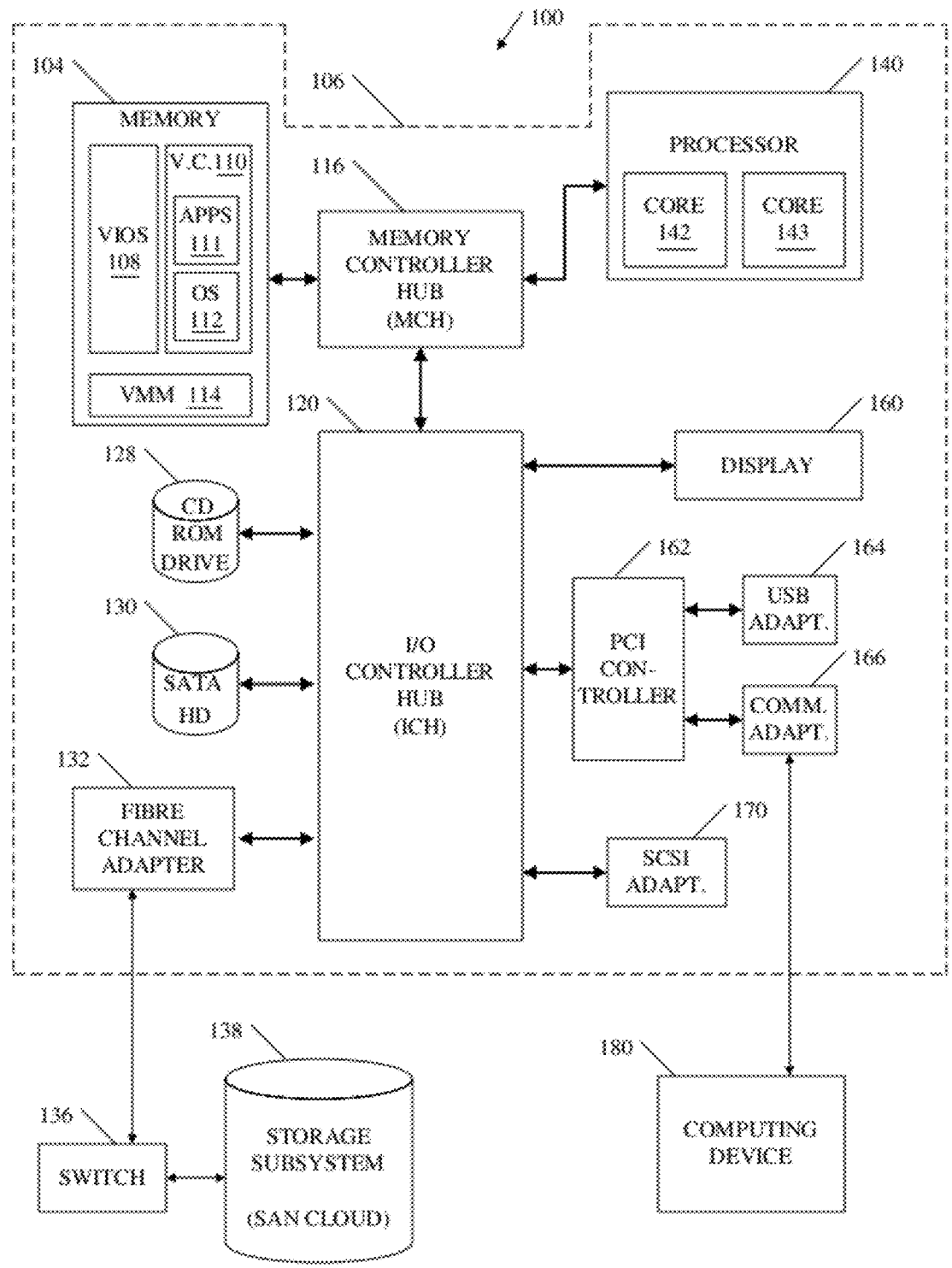
FIG. 1 depicts an embodiment of a computing device, in a system, which may generate checkpoint images for warm standby of applications in response to accesses of external references.

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally speaking, methods, apparatuses, systems, and computer program products to generate checkpoint images for warm standby of applications, considering external references by the applications, are contemplated. For example, an external reference may comprise a connection or use of services of an entity external to the set of processes that constitute the application, such as a file system, a logical device, a remote storage device, a networking device, or a process that does not belong to the set of processes that constitute the application, to which a process of the application attempts to connect by means of a socket or inter-process communication (IPC). Various embodiments comprise two or more computing devices, such as two or more servers. In the embodiments, the computing devices may generate and maintain a warm standby state of an application, wherein the application may not require special provisions during application design.

The computing devices may generate a checkpoint image of the application at a suitable point in time during initialization at which the application has not yet accessed external references whose state may change during runtime. For a checkpoint image of an application, a computing device may generate a set of core images of the application taken at a specific point in runtime. Additionally, the checkpoint image may comprise state information for IPC objects (messages, semaphores and shared memory), pipes, and sockets established between processes of the application. Properly configured servers may pre-load checkpoint images and activate checkpoint images when needed following the specific resource management rules of the distributed subsystem, such as the resource management rules of the computing devices or servers.

Embodiments may generate a checkpoint image of an application at a suitable point in runtime at which the state of the application is not yet dependent on interactions with external references, which external references may change the state of the application during subsequent runtime. The access of external references during initialization of the application may lead to resource access conflicts and invalid states if the interaction with the external references is runtime dependent. For example, resource access conflicts and invalid states may occur when an instance of the application is active on another server in a working state and the instance accesses external references, such as shared data storage or external subsystems with which the application interacts. In some embodiments, there may be external references whose access by the application during initialization is unproblematic, such as static configuration files that are read during startup or subsystems, which may tolerate multiple connections of the application.

Turning now to the drawings, FIG. 1 depicts an embodiment of a computing device 106, in a system 100, which may generate checkpoint images for warm standby of applications in response to accesses of external references. Computing device 106 has processor 140, a memory controller hub (MCH) 116, memory 104, and an I/O controller hub (ICH) 120. In numerous embodiments, computing device 106 may comprise a server, such as one server in a server cluster environment. In other embodiments, computing device 106 may comprise a mainframe computer or part of a mainframe computer system, a desktop server computer in an office environment, or an industrial computer in an industrial network. Numerous configurations are possible, consistent with the following discussion and appended claims.

Processor 140 may have a number of cores, such as cores 142 and 143, which may be coupled with cache memory elements. For example, processor 140 may have cores 142 and 143 coupled with internal processor cache memory. The number of processors and the number of cores may vary from embodiment and embodiment. For example, while computing device 106 has one processor 140, alternative embodiments may have other numbers of processors, such as two, four, eight, or some other number. The number of cores of a processor may also vary in different embodiments, such as one core, four cores, five cores, or some other number of cores.

As depicted in FIG. 1, computing device 106 may execute a number of applications, such as applications 111, using an operating system 112 in one or more virtual clients of memory 104, such as virtual client 110. For example, computing device 106 may comprise part of a larger server system, such as a computing board, or blade server, in a cluster for application management. In one embodiment, computing device 106 may be part of an HA cluster and may utilize warm standby state of an application to shorten the time it takes, after a failure affecting a resource group, to restore the application to a working state, ready to service requests, on a takeover server. In an alternative embodiment, computing device 106 may be part of a load-balancing cluster and utilize warm standby state to shorten the time it takes to bring an instance of an application online.

Current cluster implementations generally do not include maintenance of a warm standby state in the management of cluster resources. The reasons for not including such warm standby state are that many applications do not implement a warm standby state. For applications that do offer warm standby state, the warm standby state is often not suitable for a cluster environment, where resources shared between servers may be accessible exclusively on one server. The code path to reach that state may require access to such resources.

In various embodiments, applications 111 may require supporting system resources, such as memory, processors or portions of processing power, storage, and Internet protocol (IP) addresses. One or more embodiments may enable virtualization and division of the computing hardware, such as the processor(s), portions or sections of the data storage device(s), and the communication adapter(s).

Processor 140 may execute operating instructions for programs and applications 111. Applications 111 may comprise, e.g., a network mail program and several productivity applications, such as a web server, a database, or a high performance computing application. Operating system 112 may work in conjunction with virtual machine monitor 114 to block thread execution for one or more applications of applications 111 and create checkpoint images of the current state of the one or more applications of applications 111. For example, operating system 112 and virtual machine monitor 114 may block thread execution for an application at a suitable point in time during initialization of the application, when the state of the application is not yet dependent on external references.

Upon blocking thread execution for the application and creating the checkpoint image, computing device 106 may transfer the checkpoint image to computing device 180 and, potentially, other computing devices. For example, computing device 180 and the other computing devices may comprise takeover servers for a resource group that contains the application. Computing device 180 and any other takeover devices may store the image and preload the image into memory, so that the image serves as a warm standby image. In the event that computing device 180 is activated in a failover scenario, computing device 180 may start the application from the warm standby checkpoint at a point in time, when cluster application management determines to start the application. In other words, a warm standby image may be used to shorten the time for application restart if no checkpoint with runtime state exists, which will enable seamlessly resuming the application.

During operation, processor 140 may execute instructions in memory 104 by interacting with MCH 116. The types of memory devices comprising memory 104 may vary in different embodiments. In some embodiments, memory 104 may comprise volatile memory elements, such as four 4-gigabyte (GB) dynamic random access memory (DRAM) sticks. Some embodiments may comprise smaller or larger amounts of memory. For example, some embodiments may comprise 128 GB of RAM, while other embodiments may comprise even more memory, such as 512 GB. In alternative embodiments, memory 104 may comprise nonvolatile memory. For example, in some embodiments, memory 104 may comprise a flash memory module, such as a 64 GB flash memory module.

In the embodiment of FIG. 1, virtual machine monitor 114 manages one or more virtual machines, such as virtual client 110 and virtual I/O server 108. For example, virtual machine monitor 114 may comprise a hypervisor or other virtual machine management module configured to enable multiple operating systems to execute simultaneously on computing device 106. In one embodiment, such as the specific embodiment of FIG. 1, virtual machine monitor 114 may comprise an application loaded into memory 104, separate from any operating system. Virtual machine monitor 114 may provide an abstraction layer between physical hardware resources of computing device 106 and logical partitions of computing device 106, wherein virtual client 110 may reside in one of the logical partitions. Virtual machine monitor 114 may control the dispatch of virtual processors to the physical processor 140, save/restore processor state information during virtual processor context switches, and control hardware I/O interrupts and management facilities for partitions.

In different embodiments, virtual machine monitor 114 may exist in different forms. For example, in one embodiment virtual machine monitor 114 may comprise firmware coupled to processor 140. In another embodiment, virtual machine monitor 114 may comprise a software application loaded as part of or after an operating system. That is to say, virtual machine monitor 114 may comprise an application being executed by operating system 112. Some embodiments may have no separate virtual machine monitor, in which case operating system 112 may perform the functions of virtual machine monitor 114. The number of virtual machines may also vary from embodiment to embodiment. Alternatively, some embodiments may not employ virtual machine monitor 114.

Virtual client 110 and virtual I/O server 108 may each comprise collections of software programs that form self-contained operating environments. Virtual client 110 and virtual I/O server 108 may operate independently of, but in conjunction with, virtual machine monitor 114. For example, virtual I/O server 108 may work in conjunction with virtual machine monitor 114 to allow virtual client 110 and other virtual clients to interact with various physical I/O hardware elements. For example, an application of applications 111 may periodically write data to storage subsystem 138. Computing device 106 may be configured to detect such writes, intercept the writes before execution, block execution of threads that are attempting execution of the writes, and create a checkpoint image of the application for a warm standby via computing device 180.

ICH 120 may allow processor 140 to interact with external peripheral devices, such as keyboards, scanners, and data storage devices. Programs and applications being executed by processor 140 may interact with the external peripheral devices. For example, processor 140 may present information to a user via display 160 coupled to, e.g., an Advanced Graphics Port (AGP) video card. The type of console or display device of display 160 may be a liquid crystal display (LCD) screen or a thin-film transistor flat panel monitor, as examples. In some embodiments, one or more interactions with external peripheral devices may comprise external references of threads that computing device 106 may block, or enable a user to block, before creating a checkpoint image for a warm standby.

Display 160 may allow a user to view and interact with applications 111, to configure when computing device 106 may block execution of threads for creating a checkpoint image, or prompt the user for whether one or more threads should be blocked before creating the checkpoint image. For example, display 160 may allow the user or a system administrator to create and/or edit a "hints file", which may be stored on a local storage device. The hints file may specify rules for access of external references by an application, such as allowing access of specific references and timeout values for maximum runtime after an external reference has been encountered. As will be illustrated, the kernel infrastructure of operating system 112 may take into account the rules specified in the hints file while controlling thread execution and checkpoint image creation.

As briefly alluded to for numerous embodiments, ICH 120 may enable processor 140 and one or more applications of applications 111 to locally store data to and retrieve data from various data storage devices. For example in one embodiment, computing device 106 may enable applications 111 to store data to storage subsystem 138 via a SAN switch 136 coupled to fibre channel adapter 132. Virtual client 110 may be configured to have a dedicated storage device attached to fibre channel adapter 132. In the event of a failure, such as the failure of SAN switch 136, computing device 106 may enable computing device 180 to restart execution of applications 111 via warm standby checkpoint images that were previously created.

In alternative embodiments, ICH 120 may enable applications 111 to locally store and retrieve data from one or more universal serial bus (USB) devices via Peripheral Component Interconnect (PCI) controller 162 and a USB device coupled to USB adapter 164. In an embodiment, virtual client 110 may be configured to read and/or write information via virtual I/O server 108, virtual machine monitor 114, and a primary USB hard drive coupled with USB adapter 164. During initialization of individual applications, computing device 106 may be configured to detect external references of such read/writes, intercept the external references before execution, block execution of threads that are attempting to access the external references, and create checkpoint image(s) of the application(s) for a warm standby via computing device 180.

Computing device 106 may also send and receive data via PCI controller 162 and communication adapter 166. Communication adapter 166 may comprise, e.g., a network interface card (NIC). For example, an application of applications 111 may attempt to send or receive data to an Internet protocol (IP) address via communication adapter 166. Because the reference is to an IP address and device which is external to the set of processes comprising the application, operating system 112 may detect the external reference and block the execution of the associated thread in preparation for creating a checkpoint image.

In another alternative embodiment, computing device 106 may allow applications 111 to transfer data between virtual client 110 and a hard disk of an Internet Small Computer Systems Interface (iSCSI) SAN. For example, an embodiment may employ an iSCSI SAN in lieu of, or in addition to, fibre channel adapter 132. Computing device 106 may enable virtual client 110 to communicate with and transfer information to/from a primary iSCSI hard disk using communication adapter 166 via an associated NIC. During initialization of an application of applications 111, operating system 112 may monitor the execution of the application, detect a reference to the external devices (iSCSI SAN and communication adapter 166), and block execution of associated thread(s) to enable computing device 106 to create a checkpoint image.

Alternative embodiments may employ different technologies for communication adapter 166 differently. For example, one embodiment may utilize a virtual fiber-optic bus while another embodiment may employ a high-speed link (HSL) optical connection for communication adapter 166. Even though different embodiments may employ different technologies, operating system 112 may nonetheless be able to detect that references to such devices are external to the set of processes for the application and block execution of access to the references.

In addition to USB adapter 164 and communication adapter 166, ICH 120 may also enable applications 111 to locally store/retrieve data by way of Advanced Technology Attachment (ATA) devices, such as ATA hard drives, digital versatile disc (DVD) drives, and compact disc (CD) drives, like CD read only memory (ROM) drive 128. As shown in FIG. 1, the computing device may have a Serial ATA (SATA) drive, such as SATA hard drive 130. SATA hard drive 130 may be used, e.g., to locally store database information for a database application, numerous operating systems for various partitions, device drivers, and application software for virtual clients of computing device 106. For example, SATA hard drive 130 may store IBM® AIX®, Linux®, Macintosh® OS X, Windows®, or some other operating system that the computing device loads into one or more LPARs and/or workload partitions. IBM and AIX are registered trademarks of International Business Machines Corporation in the United States, other Countries, or both. Linux is a registered trademark of Linus Torvalds in the United States, other countries or both. Macintosh is a trademark or registered trademark of Apple, Inc. in the United States, other countries, or both. Windows is a trademark of Microsoft Corporation in the United States, other countries, or both. Instead of SATA hard drive 130, computing device 106 in an alternative embodiment may comprise a SCSI hard drive coupled to SCSI adapter 170 for internal storage. Of the various operating systems and various storage devices, computing device 106 may nonetheless be configured to monitor references to the storage devices, detect that the references are external to the set of processes of the application, and block execution of associated threads in preparation for creating a checkpoint image.

Figure 2:
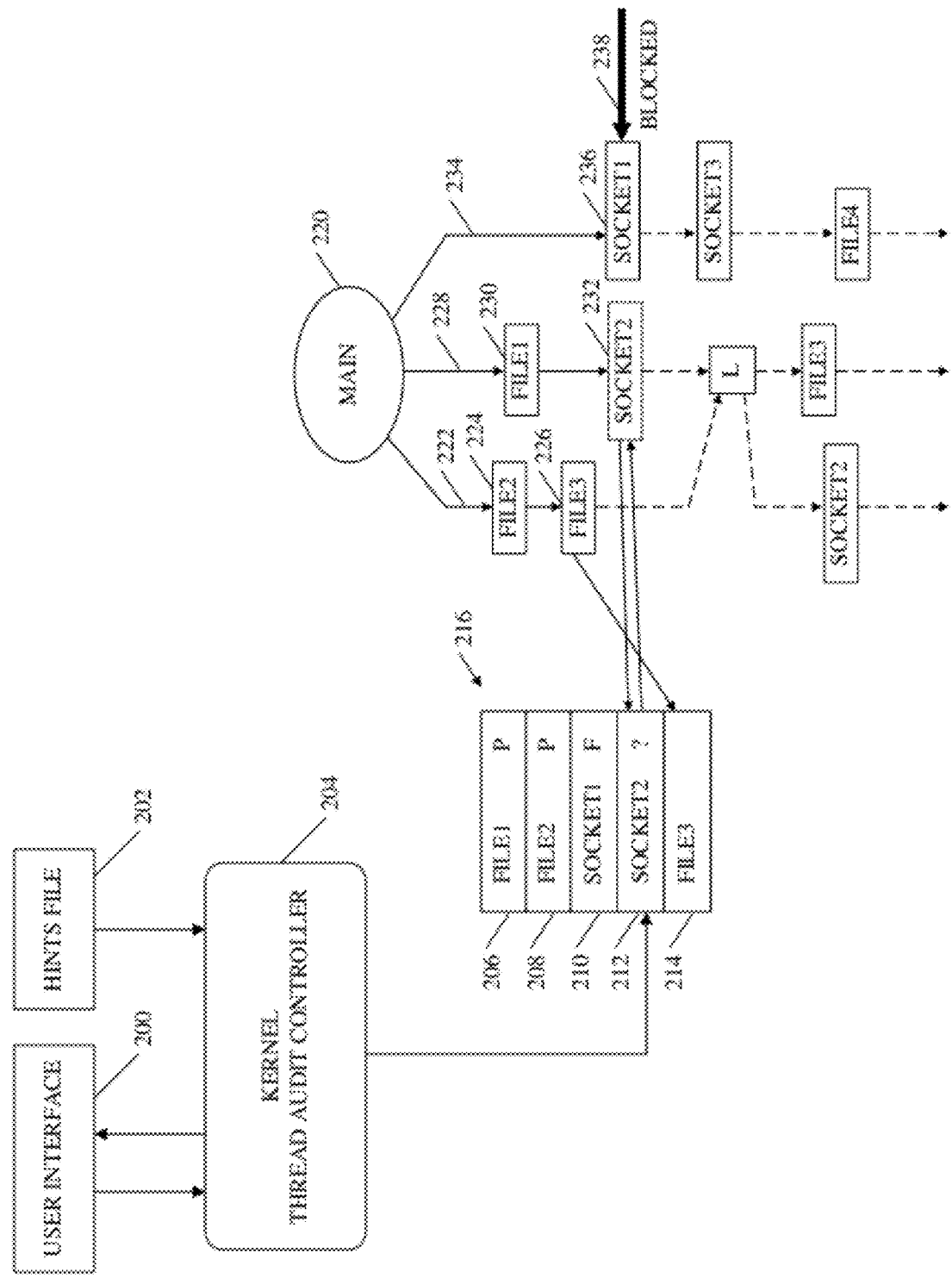
FIG. 2 illustrates how an embodiment may monitor application threads when generating a checkpoint image for an application.

To provide a more detailed illustration of how computing device 106 may monitor and block threads of applications, we turn now to FIG. 2. FIG. 2 illustrates how an embodiment may monitor application threads when generating a checkpoint image for application 220. A computing device may monitor a plurality of threads (222, 228, and 234) of application 220 when generating a checkpoint image for warm standby. For example, application 220 may correspond to an application of applications 111 in FIG. 1, wherein computing device 106 comprises an individual server, and virtual client 110 comprises a single workload partition (WPAR). In other words, the processes that constitute application 220 may be in a dedicated WPAR. During initialization, application 220 may comprise one or more processes that involve the execution of thread 222, thread 228, and thread 234. For the sake of illustration, only three threads are shown. Operating scenarios for various embodiments may include multiple processes and a large number of threads, which may easily comprise many more processes and threads than shown in FIG. 2. Alternative embodiments may monitor and block thread execution for single-threaded applications and double-threaded applications.

For the embodiment of FIG. 2, wherein the processes that constitute application 220 are in a dedicated WPAR, the embodiment may only need to monitor external references which are external relative to the set of processes, such as IP addresses that reside outside the WPAR, as well as references to external file systems (logical volume or disk). Because the WPAR may provide process isolation for application 220, a process in the WPAR may communicate to external processes only by means that are not IPC constructs (messages, semaphores and shared memory), e.g. by means of sockets or shared files.

The embodiment of FIG. 2 has an auditing subsystem, comprising kernel thread audit controller 204, which provides monitoring and/or auditing for accesses to external devices. The embodiment may modify the handling of system calls to include queue 216 that enables obtaining authorization to proceed. Information pertaining to each of the system calls may be added to for each record of queue 216. For example, queue 216, which may be created in shared memory, may comprise records 206, 208, 210, 212, and 214. Each of records 206, 208, 210, 212, and 214 may comprise a system call to a device, an argument, or a thread identification (ID) number. A thread, such as one of threads 222, 228, and 234, will block in a system call until a record of records 206, 208, 210, 212, and 214 comprising the system call has been updated with information to accept or deny a request to access the external reference subject to the system call. If the request is accepted, thread processing will continue, otherwise the thread will be blocked.

Kernel thread audit controller 204 may comprise a daemon that polls queue 216 for incoming records to process. When queue 216 contains one or more new records, kernel thread audit controller 204 may process each of the new records to determine whether each of the thread references should be executed or blocked. First, in the case where a hints file 202 has been provided, kernel thread audit controller 204 may perform a lookup to determine whether the hints file contains information pertaining to each new record. If hints file 202 contains information about a particular new record, kernel thread audit controller 204 may perform a variety of actions, which may comprise updating internal counters, such as updating an instance count for the access, and examining timers to determine whether a maximum duration has been reached. A more detailed analysis and explanation of FIG. 2 may aid in understanding.

Thread 228 may make a system call 230 to a device for a "file1" reference. Corresponding to system call 230, the embodiment creates record 206 in queue 216. Record 206 includes information (P) that designates the reference should be permitted. For example, file1 may comprise a static configuration file that hints file 202 designates as unproblematic. In other words, hints file 202 may indicate that access to file1 should be permitted even though the reference, file1, may be external to the set of processes for application 220.

Thread 222 may make a system call 224 to a device for file2. Corresponding to system call 224, the embodiment creates record 208 in queue 216. Record 208 includes information (P) that designates that access to file2 should be permitted. Consequently, thread 222 may continue executing and make a system call 226 to a device for file3. Corresponding to system call 226, the embodiment creates record 214 in queue 216. As illustrated, a thread may be allowed to continue executing until halted and blocked.

Thread 234 may make system call 236, to socket1. Corresponding to system call 236, the embodiment creates record 210 in queue 216. Record 210, upon processing by kernel thread audit controller 204, yields information (F) that designates the reference, socket1, to be an external reference that should be blocked and not executed. For example, if application 220 were permitted to access socket1 during initialization, the access would lead to resource access conflicts and cause invalid states, such as when an instance of application 220 is active on another server in a working state. In processing records 206 and 208, kernel thread audit controller 204 may enable execution for system calls 224 and 230 because hints file 202 prohibits neither of the associated references (file1 and file2). Conversely, kernel thread audit controller 204 may block execution (element 238) of system call 236 because system call 236 is either not contained in hints file 202, which may contain allowable exceptions for external references, or the user denied access to this reference when prompted by kernel thread audit controller 204.

Application 220 may be executed according to a first method or mode, which may be designated an audit mode, which may be interactive or non-interactive. When application 220 is executed in the interactive audit mode, the kernel may monitor execution of application 220 for access to external references. Once a thread reaches a call or attempted access for an external reference, the kernel infrastructure will block further execution of the thread and prompt the user to allow or disallow access of the reference. Eventually all threads may become blocked based on user interaction. Alternatively, a maximum timeout for allowed overall runtime may be reached. Or, alternatively, the user may decide to create a checkpoint image at a particular moment in the application execution. When utilizing the interactive mode, the user may be assumed to understand the application well enough to decide which external references are allowable. Hints file 202 may exist to reduce the number of external references to be processed interactively.

Illustrating the interactive mode with reference to FIG. 2, kernel thread audit controller 204 may forward a request to access, for example, socket2 to user interface 200, which prompts the user to accept or deny the request. Based on the response from the user, kernel thread audit controller 204 may update record 212 in shared memory with information whether the request is permitted or not. Application thread 228, waiting on access to updated record 212 may then unblock system call 232 and continue if the user permitted access. If the user did not permit access for system call 232, kernel thread audit controller 204 may block execution of system call 232.

Application 220 may be executed according to a second method or mode, which may be designated as a programmatic determination mode. In the programmatic determination mode, application 220 is started in a mode where kernel thread audit controller 204 monitors its execution for access to external references. Once a thread reaches an external reference, kernel thread audit controller 204 will block further execution of the thread. Eventually all threads may be blocked on external references or when a user-specified timeout for maximum runtime is reached, and in response, a checkpoint image may be created. Again, hints file 202 may specify finer grained rules for access of external references, such as allowing access of specific references and timeout values for maximum runtime after an external reference has been encountered. The kernel infrastructure may take rules specified in hints file 202 into account in controlling thread execution and checkpoint image creation. Using the programmatic determination mode may also assume that the user understands application 220 well enough to specify rules for hints file 202.

Illustrating the programmatic determination mode with reference to FIG. 2, kernel thread audit controller 204 may block further execution of thread 228 in response to encountering system call 232. Eventually, all of threads 222, 228, and 234 may be blocked. Or, application 220 may continue initializing in the programmatic determination mode until the timeout of a predetermined maximum runtime. In response to the timeout, kernel thread audit controller 204 may then block all of threads 222, 228, and 234, which may enable the creation of a checkpoint image.

In an even further alternative mode, application 220 may be initialized in a manual specification mode. In the manual specification mode, application 220 may start the initialization process. At a selected point in time, the user may issue a command that instructs the kernel to generate a checkpoint image of the set of processes belonging to application 220 at the next permissible point. For the manual specification mode, the user may be assumed to understand the architecture of application 220 well enough to determine such a point in runtime at which the state of application 220 is not yet dependent on non-permissible external references.

Eventually, at some point during initialization, in one of the three modes, all of threads 222, 228, and 234 may be blocked. In response to all threads being in block states, kernel thread audit controller 204 may signal that application 220 and/or the WPAR is ready to be checkpointed. For example, kernel thread audit controller 204 may signal to virtual machine monitor 114 that virtual client 110 is ready to be checkpointed.

As discussed, a hints file may be used during application initialization for one or more methods. While the format of the hints file may vary from embodiment to embodiment, the format of hints file 202 in FIG. 2 has the following format: TYPE SPECIFIER INSTANCE_COUNT TIMEOUT.

For the designated format, TYPE=<FS|LV|DISK|IP>, where TYPE refers to the specific type of reference. For example, the reference may be for a file system (FS), local volume (LV) or disk (DISK) storage. Alternatively, the reference may be for an Internet protocol (IP) address. For the next parameter, SPECIFIER=<filename|directory|lv_name|disk|address|*>, where SPECIFIER refers to the specific name of the reference. "*" means all references of type TYPE. Worth emphasizing, in numerous embodiments, TYPE is not limited to FS, LV, DISK, and IP, and may contain other resource types.

The third parameter, INSTANCE_COUNT, refers to the maximum number of times access to SPECIFIER is allowed. A "1" may be used to indicate that the thread should be blocked for a reference. If a reference has been accessed INSTANCE_COUNT times, all threads of the process will be quiesced after TIMEOUT if the threads are not already blocked on attempted access to an external reference. If no hints file is specified, threads may be blocked on any access to external references.

Figure 3:
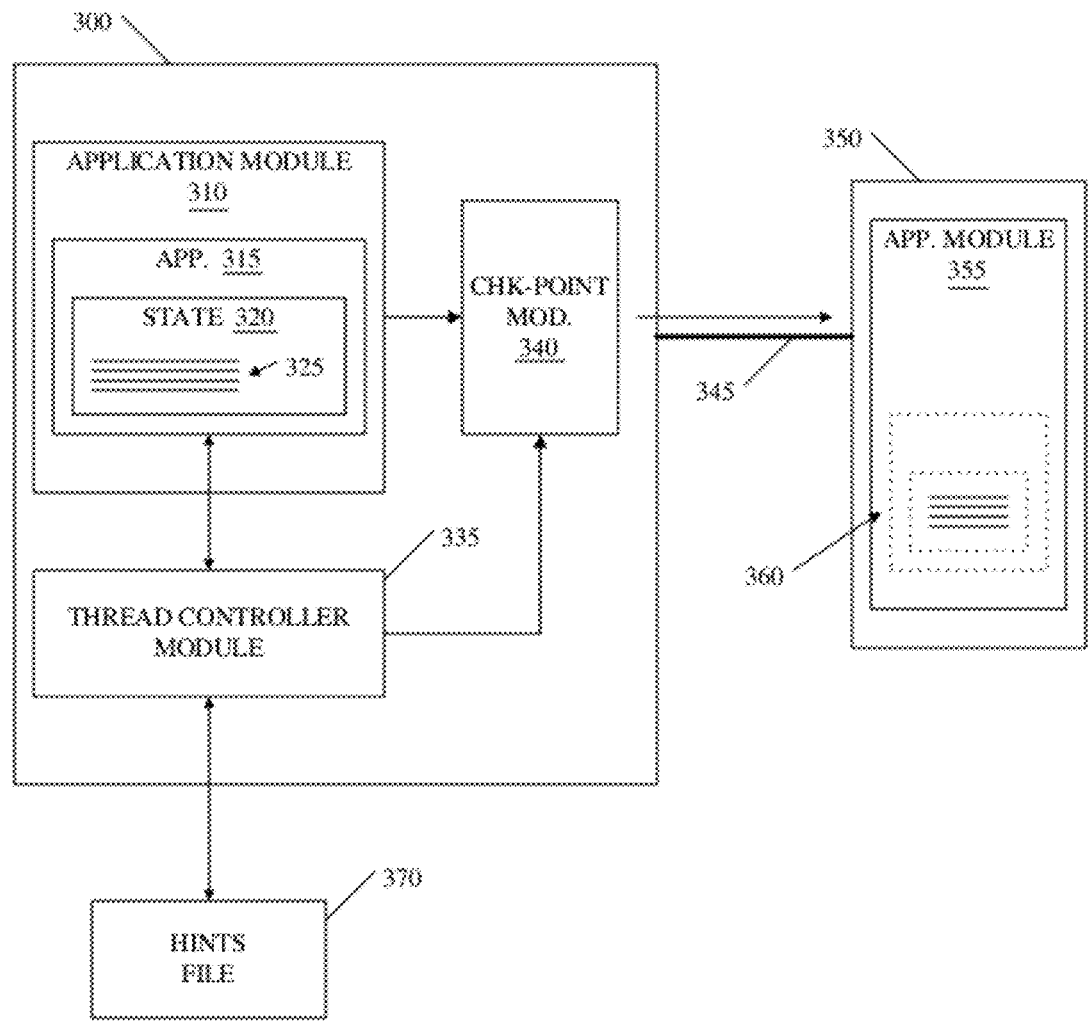
FIG. 3 depicts an apparatus configured to generate a checkpoint image of an application in response to blocked external references of the application.

FIG. 3 depicts an apparatus 300 configured to generate a checkpoint image 360 of an application 315 in response to blocked external references of application 315. Apparatus 300 can be configured to generate checkpoint image 360 of application 315 in response to blocked external references of application 315 in preparation of apparatus 350 as a warm standby unit. Either apparatus 300 or apparatus 350 may comprise a computing device, a server, a logical partition (LPAR), or other type of computing device in a multiple-computing device setting. For example, apparatus 300 and apparatus 350 may each comprise a server in a cluster for application management, such as computing device 106 and computing device 180, respectively, in FIG. 1. In various embodiments, a cluster for application management may be a HA cluster or a load balancing cluster.

As FIG. 3 illustrates, apparatus 300 and apparatus 350 may be communicably coupled via link 345. Apparatus 300 may comprise a blade server in a rack of servers in one room of a building, while apparatus 350 may comprise another server in a different rack in another room. The location of the individual apparatuses, or servers, in a system may vary from embodiment to embodiment. In some embodiments, both servers may be located together, such as in the same rack or room or in the same room. Alternatively, in other embodiments, the apparatuses may be geographically separated, separated by thousands of miles, wherein link 345 may comprise a virtual private network (VPN) connection.

In further alternative embodiments, apparatuses 300 and 350 may each comprise virtual machines in individual partitions of a virtual machine environment. For example, apparatus 300 may comprise one virtual machine in a LPAR, while apparatus 350 comprises another virtual machine in a second LPAR. The partitions may reside on the same server or on separate servers. In various embodiments, an LPAR may refer to a logical grouping, or partitioning, of microprocessor resources, memory resources, and I/O resources. For example, when an embodiment is in a virtual computing environment, a node or an LPAR may enable multiple instances of different operating systems to operate concurrently on a single computing device, such as a single motherboard of a server.

In even further alternative embodiments, apparatus 300 or apparatus 350 may comprise one or more WPARs. Depending on the embodiment, a WPAR may comprise a software partitioning element, which may be provided by an operating system. A WPAR may comprise another layer of abstraction, wherein each WPAR provides isolation from hardware and removes software dependencies on hardware features. An example embodiment may be a system with two servers, wherein each server comprises at least one LPAR that has one or more WPARs. One or more WPARs may host applications and isolate them from other applications executing within other WPARs. For example, one WPAR may comprise an e-mail application, which executes independently to, and separately from, an accounting and billing program executing within another WPAR.

One or more elements of apparatus 300 may be in the form of hardware, software, or a combination of both hardware and software. For example, in the embodiment depicted in FIG. 3, thread controller module 335 and checkpoint module 340 may comprise software code of an operating system, such as individual kernel modules, executed by one or more processors. In alternative embodiments, one or more of the modules of apparatus 300 may comprise hardware-only modules. For example, thread controller module 335 may comprise a portion of an integrated circuit chip coupled with processors for a dedicated hardware partition of a computing device, which may comprise a different arrangement than the one shown in FIG. 3. In such embodiments, thread controller module 335 may work in conjunction with application module 310, monitoring application 315 for external references, such as accesses to files of I/O devices or accesses to IP addresses. Application module 310 may comprise, e.g., a WPAR or other type of partition in a virtual machine of a server.

In even further alternative embodiments, one or more of the modules of apparatus 300 may comprise a combination of hardware and software modules. For example, checkpoint module 340 may comprise firmware and standalone processing circuitry that takes a snapshot of memory and the state of processes for application 315, and subsequently communicates checkpoint image 160 to apparatus 350 via link 345. Link 345 may comprise a network link, a shared storage link, or a combination thereof. Alternative embodiments may comprise another type of link, such as a proprietary communication bus.

In many embodiments, various modules of apparatus 300 may be implemented as part of a cluster infrastructure. For example, application module 310, checkpoint module 340, and thread controller module 335 may comprise a subsystem in a cluster, wherein the modules work together to create a checkpoint image that is stored in a repository and subsequently used by one or more application management clusters. In other embodiments, various modules of apparatus 300 may be implemented as part of an operating system. Worth emphasizing, however, many embodiments may perform the activities of creating checkpoint image data, distributing the checkpoint image data, and utilizing the checkpoint image data separately, at different points in time. In other words, an embodiment may create a checkpoint image for an application but not actually employ the checkpoint image as a warm standby image until a much later time.

In one or more embodiments, thread controller module 335 may monitor application 310 for attempted accesses to external references during initialization of application 310. For example, thread controller module 335 may monitor application 315 for I/O requests to a file or for communications via a network interface card. During initialization, application 315 may generate state 320, which comprises state information suited for restoring application 315 by way of a warm standby image. In other words, state 320 may comprise data of a set of processes 325 that constitute application 315 at a particular point in runtime during initialization of application 315.

In the embodiment of FIG. 3 and numerous other embodiments, processes may comprise independent execution units of a program or application that contain their own state information, use their own address spaces, and interact with other processes only by way of inter-process communications. A single process may contain multiple threads, the threads within a process sharing the same state and same memory space, and communicating directly with other threads by way of shared variables.

With thread controller module 335 monitoring application 315 for external references, each of the individual threads for set of processes 325 may be blocked at a point in time before application 315 is dependent on interactions with external references. Again, external references may refer to external entities, such file systems, logical devices, remote storage, networking devices, or other processes that do not belong to the set of processes that constitute the application, to which a process of application 315 attempts a connection by means of a socket or IPC. In determining which external references to block, thread controller module 335 may access hints file 370 and potentially receive input from a user. By blocking the individual threads of set of processes 325 before the threads generate potential resource access conflicts and invalid states, checkpoint module 340 may create a checkpoint image, saving a set of core images of application 315, which may include state information for IPC objects (messages, semaphores and shared memory), pipes, and sockets established between processes of application 315. Checkpoint module 340 may pre-load checkpoint image 360 on apparatus 350, and in response, checkpoint image 360 may be activated when needed.

Once checkpoint module 340 generates and preloads checkpoint image 360 in application module 355, apparatus 350 may resume execution of application 315 from checkpoint image 360. For example, application module 355 may start executing code of application 315 at the point where all of the individual threads became blocked, instead of having to reinitialize application 315.

The number of modules in an embodiment of apparatus 300 may vary. Some embodiments may have fewer modules than those module depicted in FIG. 3. For example, one embodiment may integrate the functions described and/or performed by thread controller module 335 with the functions of checkpoint module 340 into a single module. That is to say, an alternative embodiment may have a single module capable of monitoring an application for external references during initialization and creating a checkpoint image upon blocking the threads of the application processes.

Further embodiments may include more modules or elements than the ones shown in FIG. 3. For example, alternative embodiments of an apparatus may include two or more application modules, additional modules such as virtual machine monitors and virtual I/O servers, and additional takeover apparatuses which apparatus 300 may load a warm standby image onto. Even further, in some alternative embodiments, thread controller module 335 or checkpoint module 340 may comprise numerous modules, which may or may not be in the same physical device. For example, thread controller module 335 or checkpoint module 340 may be spread among multiple servers in a server system, such as existing in multiple client management modules of servers in a cluster. Several servers of the system may comprise one or more virtual clients and/or virtual I/O servers.

Figure 4:
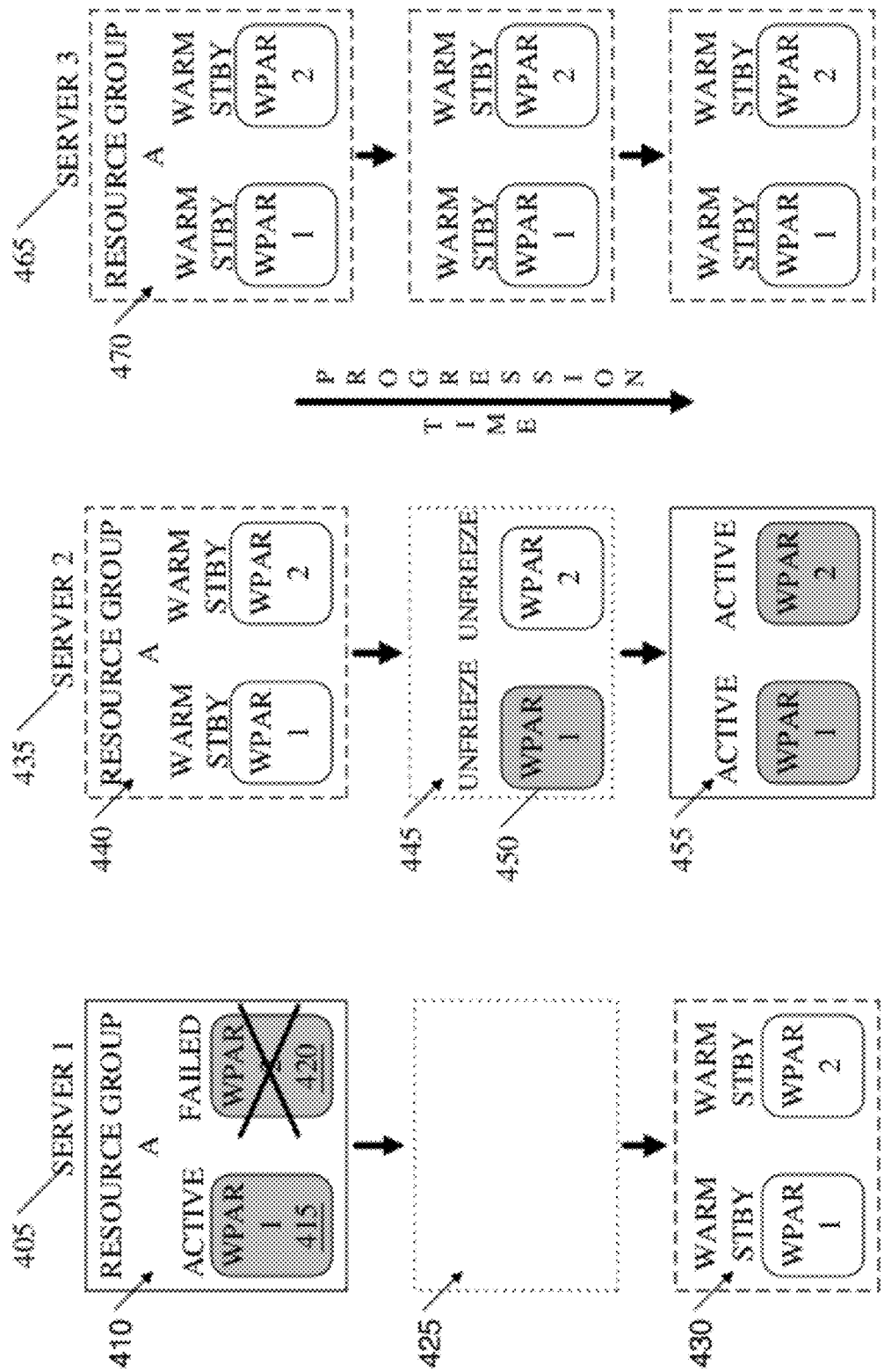
FIG. 4 illustrates in more detail how an embodiment with three servers may employ warm standby images in the management of applications.

FIG. 4 illustrates in more detail how an embodiment with three servers may employ warm standby images in the management of applications. The cluster management infrastructure for the cluster of servers 405, 435, and 465 may provide a framework for management of warm standby checkpoint images of applications.

What constitutes a cluster management infrastructure may vary in different embodiments. In some embodiments, a virtual machine monitor of one server may communicate with other individual virtual machine monitors of the other servers to provide the cluster management infrastructure. For example with reference to FIG. 1, virtual machine monitor 114 of computing device 106 may communicate with a virtual machine monitor of computing device 180 to provide cluster management services for resource groups of computing devices 106 and 180. In other words, one or more embodiments may have a cluster management infrastructure that is decentralized, wherein individual servers work with other servers of the cluster to provide cluster management services. In an alternative embodiment, a single server may execute a program, which communicates with other servers in a cluster to provide cluster management services. In other words, the cluster management infrastructure may be centralized, wherein a single server coordinates the cluster management activities. For the discussion related to FIG. 4, the cluster management infrastructure may be decentralized and comprise a virtual machine monitor executing on each of servers 405, 435, and 465.

Each of servers 405, 435, and 465 may host one or more resource groups. For example server 405 has resource group 410, wherein resource group 410 comprises WPAR 415 and WPAR 420. WPARs 415 and 420 may each comprise one or more applications. For the sake of simplicity and illustration, other resource groups and the communication links between each of the servers are not shown.

The cluster management infrastructure may copy WPAR checkpoints that constitute warm standby states of applications. The warm standby states of applications may be generated by, e.g., the cluster management infrastructure consisting of an application module, a thread audit controller, and a checkpoint module, such as the modules described for FIG. 3. The cluster management infrastructure may pre-load the warm standby states of applications on all servers that may host the resource group to which each WPAR belongs. In context of application management, the cluster management infrastructure may activate a WPAR on a server, to start the corresponding application from its warm standby state.

At a previous time, the cluster management infrastructure for servers 405, 435, and 465 may have monitored the initialization of applications in WPARs 415 and 420. The cluster management infrastructure may have blocked thread execution at appropriate points in the runtimes of the applications and generated checkpoint images comprising the images for the WPARs containing the applications. Having saved the checkpoint images, the cluster management infrastructure may load, start, activate, and relocate the images and resource groups via a series of actions.

When the cluster services are started, for resource group 410 and all other resource groups that are acquired on server 405, the cluster management infrastructure may configure supporting resources. For resource groups that are to be active, the cluster management infrastructure may load the checkpoint images of its applications and WPARs on all servers in which the resource group may be active. For example, the warm standby images of WPARs 415 and 420 may be loaded. In various embodiments, the starting of clustering services and the distribution of the warm standby checkpoints may occur in parallel.

Upon loading the checkpoint images, the cluster management infrastructure may start the resource group and activate the checkpoints of the WPARs. For example, server 405 may start resource group 410 and activate the checkpoint images for WPARs 415 and 420. For all other resource groups that may reside on servers, but will not be activated at cluster startup, warm standby checkpoints of all WPARs of the resource group may be loaded. For example, server 435, which belongs to the server list of resource group A, may load the WPARs but not yet activate the WPARs. Server 465, which again belongs to the server list of resource group A, may load the WPARs that comprise warm standby images but not activate the WPARs.

Once a resource group has been loaded and activated on a server, the resource group may operate until the resource group needs to be relocated. For example, a user may request that resource group 410 be relocated or server 405 may detect an error. In FIG. 4, a failure has occurred for WPAR 420. During relocation of a resource group, numerous actions may occur.

On the server where the resource group has been online, the affected server will attempt to terminate all the applications, gracefully if possible. For example, resource group 410 has been online in server 405. Server 405 will attempt to gracefully terminate the applications of WPARs 415 and 420. Upon terminating the applications, server 405 may stop WPARs 415 and 420, de-configure the associated resources (element 425) of resource group 410, and activate the warm standby image of the WPARs (element 430). The de-configuring of the resources and the loading of the warm standby images may both occur in parallel.

On the server where the resource group will be online, supporting resources may be configured and warm standby checkpoints of WPARs of the resource group may be activated. Continuing with our previous example, the resource group may be relocated from server 405 to server 435. Server 435 may configure the supporting resources for resource group 440. As supporting resources are configured, server 435 may activate the checkpoints (element 445) so that the application is started from its warm standby state (element 455).

In some alternative embodiments, the servers of the cluster may generate and transfer checkpoint images of WPARs in order to relocate resource groups that have images of application processes intact. For example, the servers may halt execution of the applications in such a way to create checkpoints that may be relocated to another server without being restarted.

For each WPAR belonging to the resource group, such as WPAR 415 and WPAR 420, server 405 may determine if an intact image of its applications exists in memory, based on errors generated by supporting resources and applications. For all WPARs with intact images in memory, server 405 may quiesce the associated devices, submit the I/O requests to remote servers for completion if needed, and generate checkpoints of the intact images.

Server 405 may unload warm standby images (element 450) on the takeover server, so that the checkpoint images of the intact applications for WPAR 415 may be loaded. Server 405 may load checkpoint images of the intact applications for WPAR 415. With the recently loaded checkpoint image for WPAR 415, as well as the previously loaded warm standby image for WPAR 420, server 405 may unfreeze all images of the WPARs of the resource group (element 445). Upon unfreezing the images, WPAR 415 may resume execution of its applications, while the applications of WPAR 420 may be started via the warm standby image (element 455). With the relocation of resource group 410 to server 435, server 405 may load warm standby checkpoints of all WPARs of the resource group (element 430) for future relocation activities.

While the previous examples described relocating applications from server 405 to server 435 in a couple of failure scenarios, other operating scenarios may involve relocating applications to other servers of the cluster. For example, resource group 410 may have been started on server 405, with WPARs 415 and 420 being initially activated. Warm standby images for resource groups 440 and 470 may have been loaded on servers 435 and 465, respectively, but not activated. Upon encountering the failure, the applications may have been started on server 465 instead of server 435. Alternatively, the applications may have been started on server 435, but may be relocated to server 465 shortly thereafter. For example, the cluster resource management of the cluster may determine that server 435 is overburdened with the relocation of the applications and WPARs 415 and 420. The cluster management infrastructure may determine that available resources of server 465 may handle applications of WPARs 415 and 420 without being overburdened. Accordingly, the cluster management infrastructure may enable server 435 to relocate the applications and WPARs to server 465. Such a scenario exemplifies one embodiment. As one skilled in the art will appreciate, numerous other configurations, which enable countless other failure and relocation scenarios, may be implemented consistent with the teachings described.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
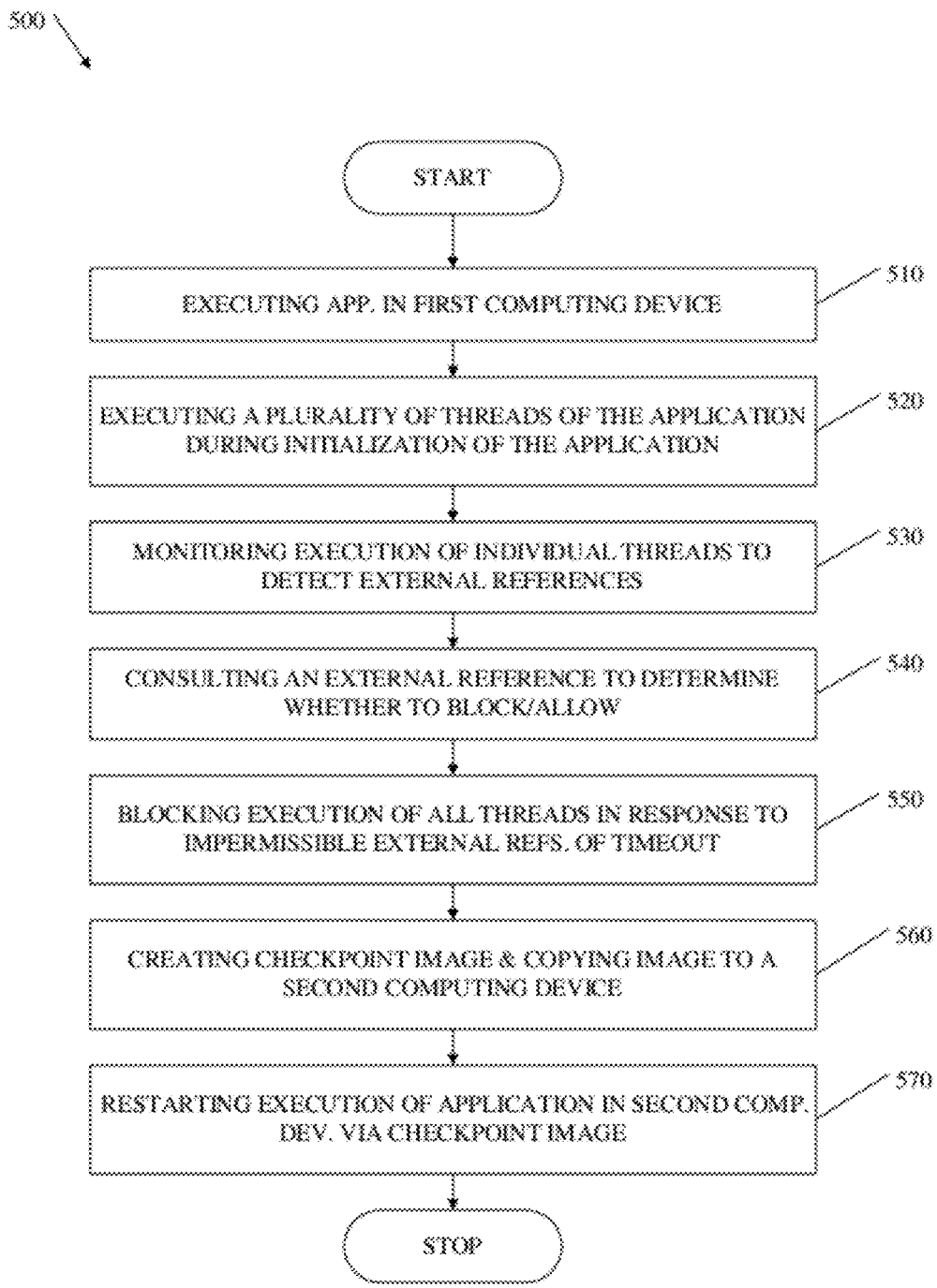
FIG. 5 illustrates a flowchart of a method for generating and managing a warm standby image for a plurality of computing devices.

FIG. 5 illustrates a flowchart 500 of a method for generating and managing a warm standby image for a plurality of computing devices. For example, an embodiment of apparatus 300 shown in FIG. 3 may comprise a server in a cluster, wherein the cluster infrastructure is configured to implement the method and monitor application 315, block threads during initialization, generate a checkpoint image, and copy the checkpoint image to apparatus 350 for warm standby.

As application module 310 executes application 315 (element 510), apparatus 300 may execute a plurality of threads of application 315 during initialization (element 520). Thread controller module 335 may monitor the execution of application 315 to detect external references of the threads (element 530). For example, one or more threads may attempt to access devices, files, or processes that do not belong to the set of processes 325 that constitute application 315. Thread controller module 335 may halt execution of threads at the points when the threads are about to initiate the calls to access the external references. Depending on the mode of operation for apparatus 300, thread controller module 335 may consult a hints file 370 to determine whether to block the threads or to enable them to continue (element 540). Alternatively, or additionally, thread controller module 335 may respond to user input when determining whether to allow or prevent continued thread execution (element 540).

As application 315 continues initializing, thread controller module 335 may block all threads of set of processes 325, such that application 315 ceases to execute (element 550). For example, thread controller module 335 may block all threads based on attempted accesses to impermissible external references, or when a timeout condition has been met.

In response to all threads of application 315 being blocked, thread controller module 335 may trigger checkpoint module 340 to generate a checkpoint image for process set 325 (element 560). Checkpoint module 340 may either generate checkpoint image 360 directly in apparatus 350, or generate the image locally and transfer to apparatus 350, and in response, apparatus 350 may restart execution of application 315 (element 570).

Another embodiment is implemented as a program product for implementing systems, methods, and apparatuses described with reference to FIGS. 1-5. Embodiments may contain both hardware and software elements. Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A data processing system suitable for storing and/or executing program code may include one or more processors coupled directly or indirectly to one or more computer-readable memory elements through a system bus. The computer-readable memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Those skilled in the art, having the benefit of this disclosure, will realize that the present disclosure contemplates handling input/output (I/O) errors for applications in multiple computing device environments. The form of the embodiments shown and described in the detailed description and the drawings should be taken merely as examples. The following claims are intended to be interpreted broadly to embrace all variations of the example embodiments disclosed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a checkpoint image for warm standby, the method comprising:
   a computing device executing a plurality of threads of an application during initialization of the application, wherein the application comprises a set of processes;
   the computing device blocking execution of the plurality of threads, wherein the blocking execution of at least one thread of the plurality of threads comprises blocking execution of the at least one thread in response to detecting a reference that is external to the set of processes, wherein the reference comprises the at least one thread attempting to communicate via one of a socket and an inter-process communication; and
   the computing device generating, in response to the blocking execution of the plurality of threads, the checkpoint image of the set of processes to enable execution of the application via a second computing device.

2. The method of claim 1, wherein the computing device blocking execution of the plurality of threads comprises the computing device blocking the execution of at least one other thread of the plurality of threads in response to issuance of a command by a user, wherein the command instructs a kernel of the computing device to generate the checkpoint image.

3. The method of claim 1, wherein the computing device executing the plurality of threads comprises operating a kernel of the computing device in a mode that monitors the plurality of threads to detect the reference, wherein the attempt to communicate is to one of a file system, a logical device, a remote storage device, a network device, and a process that belongs to a second set of processes.

4. The method of claim 3, further comprising: the computing device detecting, via the kernel, the reference, wherein the computing device blocking execution of the at least one thread is in response to the detecting.

5. The method of claim 4, wherein the computing device blocking execution of the plurality of threads comprises the computing device blocking execution of at least one other thread in response to the computing device executing the application for a predetermined amount of time, wherein the computing device executing the plurality of threads comprises the computing device executing the plurality of threads in a partition of a virtual machine, wherein the computing device comprises a first server in an application management cluster of servers, and wherein the second computing device comprises a second server in the application management cluster.

6. The method of claim 3, further comprising: the computing device detecting, via the kernel, the reference, and the computing device generating a prompt that enables a user to select blocking execution of the at least one thread, wherein the computing device generating the prompt is in response to the computing device detecting the reference.

7. A computer program product comprising one or more hardware computer-readable, tangible storage devices and computer-readable program instructions which are stored on the one or more storage devices and when executed by one or more processors, perform the method of claim 1.

8. A computer system comprising one or more processors, one or more hardware computer-readable memories, one or more computer-readable, tangible storage devices and program instructions which are stored on the one or more storage devices for execution by the one or more processors via the one or more memories and when executed by the one or more processors perform the method of claim 1.

9. An apparatus, comprising:
   a processor;
   an application module to execute, via the processor, a plurality of threads of an application and generate state of a set of processes for the application, wherein the state comprises data generated during initialization of the application;
   a thread controller module to determine points of execution for each thread of the plurality of threads at which to block execution, wherein the thread controller module is configured to block execution of at least one thread in response to the at least one thread attempting to access a reference that is external to the set of processes, wherein the reference comprises an attempt to communicate via one of a socket and an inter-process communication; and a checkpoint module to create a checkpoint image of the state in response to the thread controller module blocking execution of the plurality of threads, wherein the checkpoint module creates the checkpoint image to enable another apparatus to execute the application via the checkpoint image.

10. The apparatus of claim 9, further comprising a memory module to store the application.

11. The apparatus of claim 10, further comprising a virtual machine monitor (VMM) module to enable the application module to execute the plurality of threads within a partition of a virtual machine of a server.

12. The apparatus of claim 11, wherein the thread controller module is configured to monitor execution of the application module and detect references that are external to the set of processes and cause the application module to block execution of individual threads in response to detecting the references that are external to the set of processes, wherein an operating system of the partition comprises the thread controller module.

13. The apparatus of claim 12, wherein the thread controller module is configured to access a file, wherein the file comprises data that enables the thread controller to determine whether each thread of the individual threads is to be blocked.

14. The apparatus of claim 12, wherein the thread controller module is configured to respond to input from a user to determine whether each thread of the individual threads is to be blocked.

15. The apparatus of claim 14, further comprising a management module configured to manage operations of the application module and manage operations of an application module of the another apparatus.

16. The apparatus of claim 15, wherein the thread controller is configured to block at least one other thread of the plurality in response to execution of the application for a predetermined amount of time.

17. A computer system for generating a checkpoint image for warm standby, the computer comprising:
one or more processors, one or more hardware computer-readable memories, and one or more computer-readable, tangible storage devices;
program instructions, stored on at least one of the one or more storage devices for execution by at least one of the one or more processors via at least one of the one or more memories, to execute a plurality of threads of an application for initialization of the application, wherein the application comprises a set of processes;
program instructions, stored on at least one of the one or more storage devices for execution by at least one of the one or more processors via at least one of the one or more memories, to monitor execution of the plurality of threads and block execution of a thread of the plurality of threads in response to detecting a call to one of a socket and an inter-process communication; and
program instructions, stored on at least one of the one or more storage devices for execution by at least one of the one or more processors via at least one of the one or more memories, to enable creation of the checkpoint image of the set of processes in response to the blocking execution of the plurality of threads; and program instructions, stored on at least one of the one or more storage devices for execution by at least one of the one or more processors via at least one of the one or more memories, to transfer the checkpoint image to a second computer system to enable the second computer system to start execution of the application via the checkpoint image.

18. The computer system of claim 17 further comprising:
program instructions, stored on at least one of the one or more storage devices for execution by at least one of the one or more processors via at least one of the one or more memories, to transfer the checkpoint image via a link of communication, wherein the link of communication comprises one of a shared memory connection and a network.

19. The computer system of claim 18 further comprising:
program instructions, stored on at least one of the one or more storage devices for execution by at least one of the one or more processors via at least one of the one or more memories, to access a file to determine whether to block execution of at least one other of the plurality of threads, wherein the program instructions to execute the plurality of threads of the application execute the plurality of threads via a partition of a virtual machine.

20. A computer program product for generating, via a first computing device, a checkpoint image for warm standby, the computer program product comprising:
one or more hardware computer-readable, tangible storage devices;
program instructions, stored on at least one of the one or more storage devices, to execute a plurality of threads of an application during initialization of the application, wherein execution of the application comprises generating state data of a set of processes;
program instructions, stored on at least one of the one or more storage devices, to block execution of the plurality of threads, wherein the blocking execution of at least one thread of the plurality comprises blocking execution in response to detecting a call to a reference that is external to the set of processes, wherein references that are external to the set comprise attempts of communication via a socket or an inter-process communication; and
program instructions, stored on at least one of the one or more storage devices, to generate the checkpoint image of the set of processes to enable execution of the application via a second computing device, wherein the program instructions to generate the checkpoint image generate the checkpoint image subsequent to the plurality of threads being halted.

21. The computer program product of claim 20 further comprising program instructions, stored on at least one of the one or more storage devices, to execute the plurality of threads via a virtual machine monitor (VMM) module within a partition of a virtual machine.

22. The computer program product of claim 21 further comprising program instructions, stored on at least one of the one or more storage devices, to monitor execution of the plurality of threads to detect the reference, wherein the program instructions to block execution of the plurality of threads access a file determine whether to block execution of at least one of the plurality of threads.

* * * * *